United States Patent [19]

Ruf, deceased et al.

[11] 3,940,852
[45] Mar. 2, 1976

[54] PORTABLE HAND-HELD POWER-OPERATED SHEET CUTTING DEVICE

[76] Inventors: Ernest H. Ruf, deceased, late of Hayward, Calif., by Norma J. Ruf, executrix, 26589 Eldridge Ave., Hayward, Calif. 94544

[22] Filed: Oct. 21, 1974

[21] Appl. No.: 516,154

[52] U.S. Cl. .................................. 30/241; 30/500
[51] Int. Cl.² ........................................ B23D 27/02
[58] Field of Search .............. 30/228, 241, 242, 500

[56] References Cited
UNITED STATES PATENTS

| | | | |
|---|---|---|---|
| 2,201,599 | 5/1940 | Trautmann | 30/241 X |
| 2,272,295 | 2/1942 | Forss | 30/228 |
| 2,318,982 | 5/1943 | Wilhide | 30/228 |
| 3,340,610 | 9/1967 | Hendrickson | 30/228 X |

Primary Examiner—Al Lawrence Smith
Assistant Examiner—J. C. Peters
Attorney, Agent, or Firm—Warren, Chickering & Grunewald

[57] ABSTRACT

A portable hand-held power device having a slotted entryway for sheet material to be cut; a tool mounted for reciprocation across such entryway and formed with an offset shoulder having a cutting edge movable to and from one side of the entryway, acting as a support for the material to be cut, for impacting a sheet against such side and shearing successive sections of material therefrom as the sheet is advanced through the entryway.

6 Claims, 6 Drawing Figures

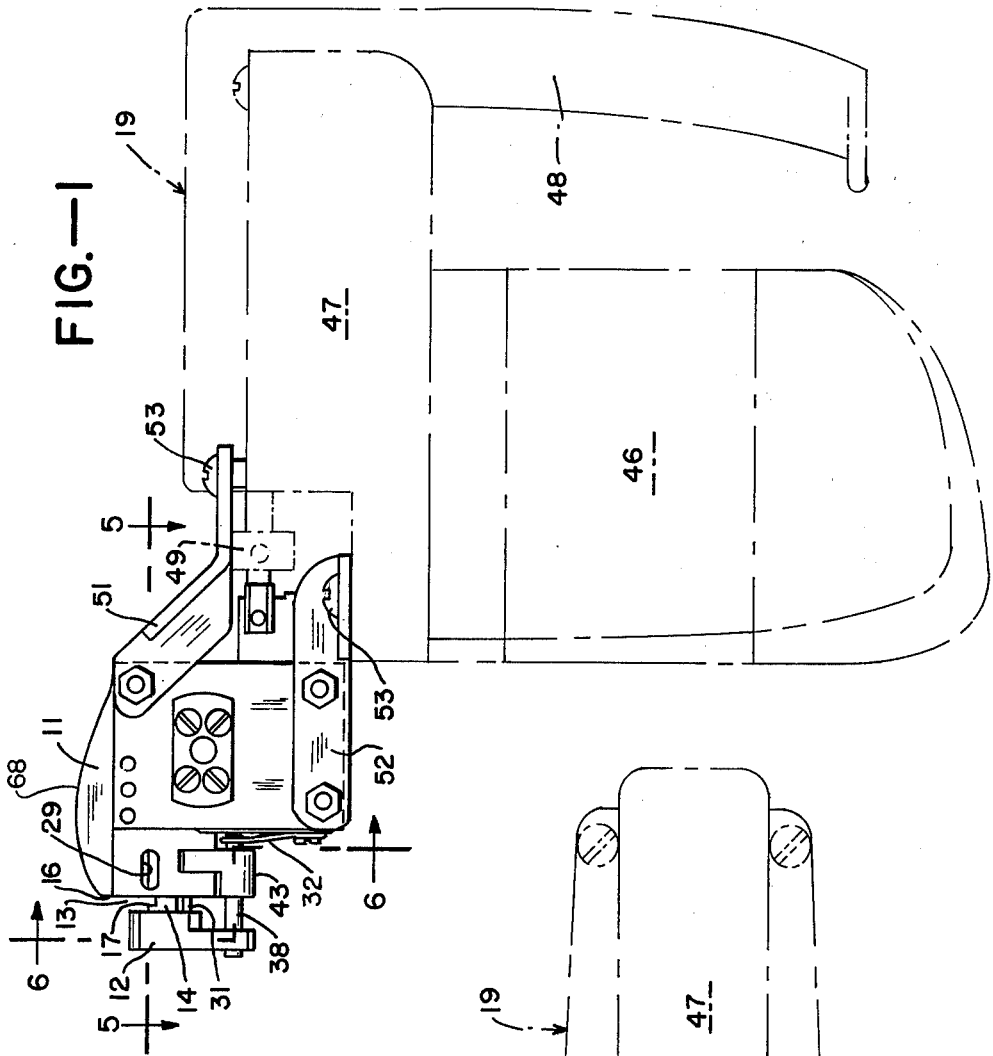
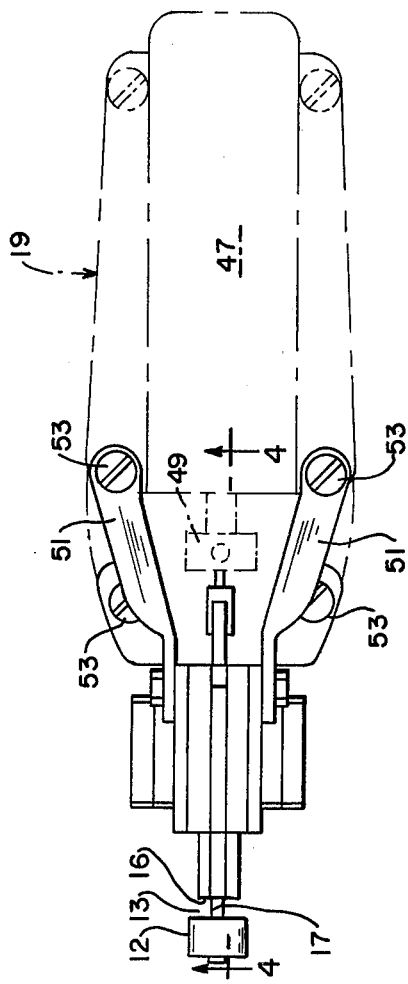

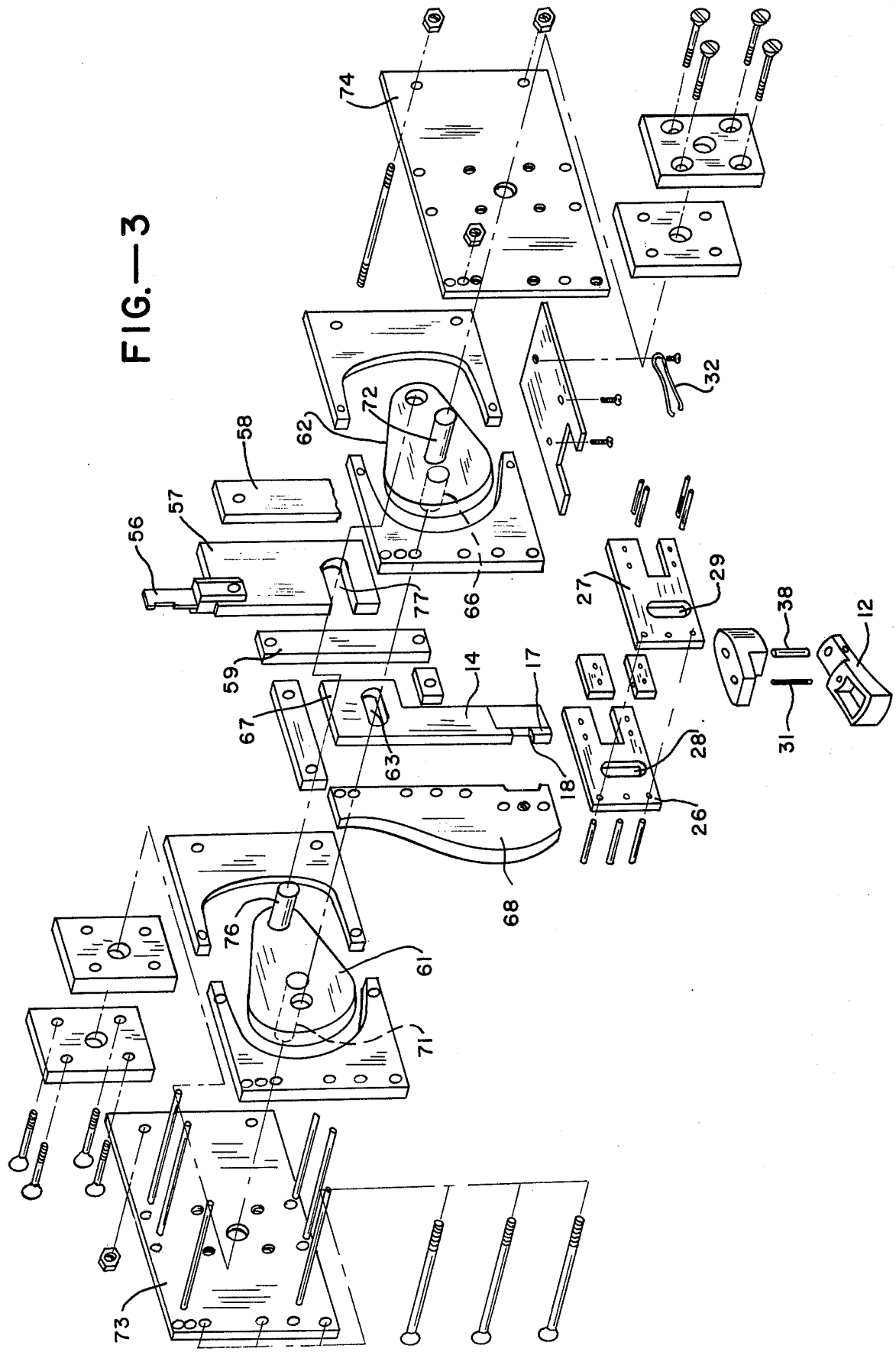

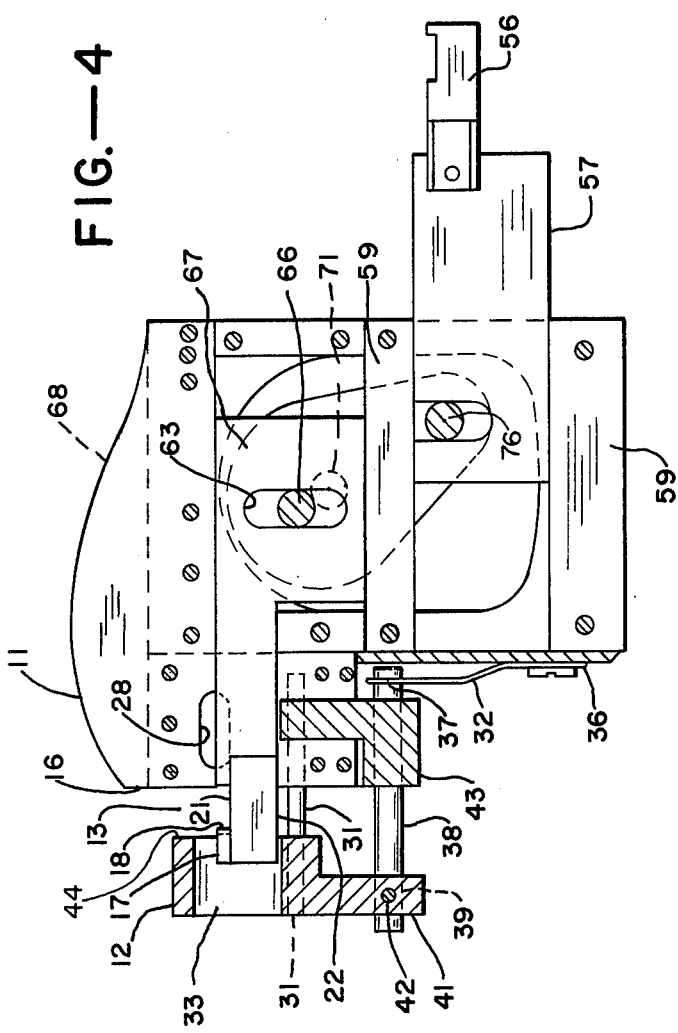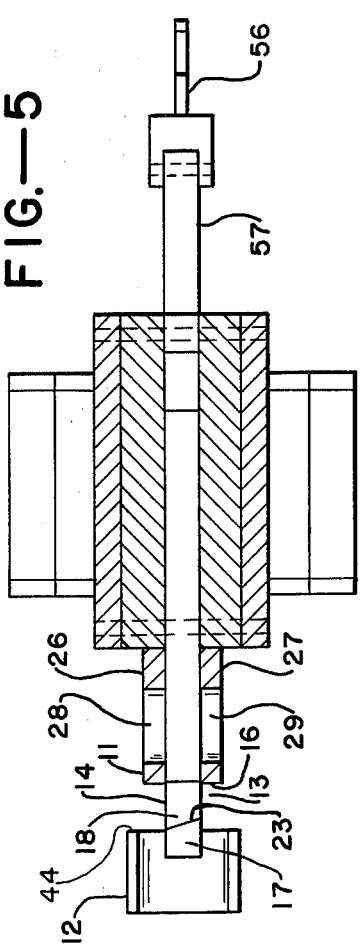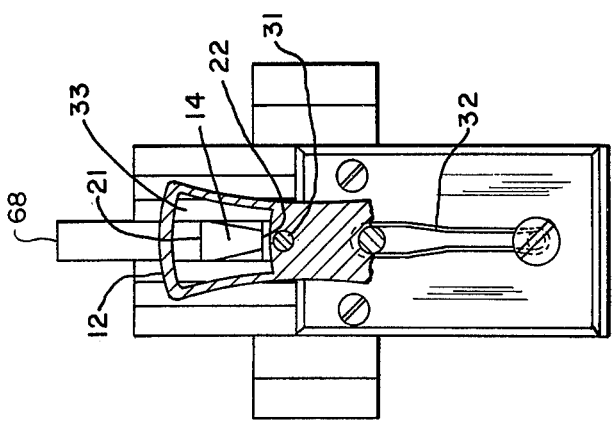

PORTABLE HAND-HELD POWER-OPERATED SHEET CUTTING DEVICE

BACKGROUND OF THE INVENTION

The invention relates to power-driven hand tools for cutting sheet material as, for example, the common electric motor-driven circular saw and electric motor-driven saber saw.

SUMMARY OF INVENTION

A present sheet-cutting device functions by engaging a sheet to be cut within a slotted entryway of the tool and by "pinching off" or clamping the sheet between a reciprocating cutting tool and a supporting surface of the device, with the tool being formed to "chisel out" or shear off a chip of material on each stroke, thereby removing successive sections of the sheet over the length of the cut as the sheet is advanced through the entryway.

An object of the present invention is to provide a portable hand-held, power-operated sheet-cutting device of the character described which will make rapid, clean cuts in all forms of sheet material, including sheet metal, with the tool cutting faster, smoother, and through heavier material than portable power tools heretofore available.

Another object of the present invention is to provide a sheet-cutting tool of the character above which will be extremely rugged and capable of withstanding heavy, continuous usage over long periods of time without breakdown.

A further object of the present invention is to provide a sheet-cutting device of the character described which will cut sheet material along straight or curved lines with equal facility.

Still another object of the present invention is to provide a sheet-cutting device of the above character which will be of relatively lightweight and compact construction, of simple and economic manufacture, and have the ability to operate very smoothly at high speeds.

Yet a further object of the present invention is to provide a sheet-cutting device of the character described which may be easily and rapidly disassembled for changing of the cutting tool when required.

The invention possesses other objects and features of advantage, some of which of the foregoing will be set forth in the following description of the preferred form of the invention, which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 1 is a side elevation of a portable hand-held, power-operated sheet-cutting device constructed in accordance with the present invention;

FIG. 2 is a plan view of the device;

FIG. 3 is an exploded perspective view of the several parts making up the cutting head section of the device;

FIG. 4 is a cross-sectional view of the device;

FIG. 5 is a cross-sectional view of the device taken substantially on the plane of line 5—5 of FIG. 1; and FIG. 6 is a fragmentary cross-sectional view of the device taken substantially on the plane of line 6—6 of FIG. 1.

DETAILED DESCRIPTION OF INVENTION

The portable hand-held, power-operated sheet-cutting device of the present invention comprises briefly a support 11; means 12 spaced from the support and defining therewith a slot 13 providing an entryway for a sheet to be cut; and a tool 14 mounted for reciprocation across slot 13 substantially perpendicular to an end face 16 of support 11, tool 14 being formed with a shoulder 17 offset in the direction of entryway 13 and provided with a cutting edge 18 confronting support surface 16 for impacting a sheet against surface 16 and shearing a section of material from the sheet. A power drive for reciprocating tool 14 may be obtained from an electric motor either as part of the tool or from an auxiliary tool such as a saber saw 19, here illustrated. The present invention is well adapted for construction as an attachment to a saber saw although, as will be understood, the electric motor drive may be incorporated directly in the present tool to provide a self-contained unit.

As will be best seen from FIGS. 1 and 4, shoulder 17 is positioned on the normally leading side 21 of tool 14; that is, facing entryway 13, and the tool is tapered in cross section, as seen in FIG. 6, with its widest dimension at leading side 21 and a reduced width at its normally opposite trailing side 22, so as to provide clearance in the cutaway part of the sheet and to permit relative rotational displacement of the tool and sheet for cutting curved configurations. As a further and important feature of the device, tool 14 is of elongated form and is mounted for lengthwise reciprocation, with its length substantially perpendicular to supporting face 16; and the cutting portion or edge 18 of the tool is bevelled, as seen in FIG. 5, with respect to the length of the tool, with the leading cutting edge 23 confronting support surface 16 so as to enter the sheet being cut with a progressive shearing action.

Preferably, support 11 here comprises a housing having a pair of spaced opposite side walls 26 and 27, see FIG. 5, forming a guideway therebetween for supporting tool 14 for reciprocation; at least one of the side walls being formed with a chip-ejection opening 28; and the tool is provided with a stroke moving the cutting portion 18–23 across entryway 13 and into registration with opening 28 for ejection of chips removed from the sheet. Preferably, the opposite side wall 27 is formed with a similar chip-ejection opening 29 in registration with opening 28.

Means 12, co-functioning with support wall 16 to define the slotted entryway for the sheet material to be cut, here comprises a head which is secured to the support 11 adjacent the trailing side 22 of the tool by attachment means 31, having a dimension perpendicular to slot 13 less than the width of the cutting edge 18 of the tool, so as to pass attaching means 31 through the cutaway portion of a sheet. As a feature of the present invention, support means 31 provides a pivotal attachment of head 12, enabling rotational displacement of the head in a plane substantially perpendicular to the axis of reciprocation of tool 14, thereby enabling head 12 to follow the cutting of a sheet along a curved configuration. As a further feature, a spring 32 is connected to head 12 for biasing the rotational position of head 12 for straight-line cutting of a sheet; that is, with the head lined up in the plane of reciprocation of tool 14, as seen in FIG. 6. With reference to FIGS. 4 and 6, it will be noted that head 12 is formed with an opening 33 therethrough for accommodating the reciprocation of the outer end of tool 14, and support 31 here comprises a pivot pin journalling head 12 adjacent the lower end of opening 33, as seen in FIG. 6. Spring 32 is attached at one end 36 to the support housing and at its other end to pin 38 carried in a bore 39 through a lower end portion 41 of head 12. A set screw 42 carried by head portion 41 and bearing on pin 38 may be used to adjust the position of head 12 longitudinally on pin 38 and thereby adjust the width of the slotted entryway 13 to accommodate sheets of different thickness. Pin 38 is here also mounted through and carried by a bracket 43, also pivoted on pin 31 for greater stability of mounting of head 12. Preferably, tool 14 is provided with a stoke sufficient to move cutting portion 18 from a position within head 12 at its widest spacing from support 16, to a position in registration with openings 28 and 29. In practice, it has been found that a tool travel of about 3/16 inch is satisfactory. Such travel provides a maximum sheet-cutting capacity of about 1/8 inch. Normally, head 12 will be set for a slot width slightly larger than the thickness of the sheet being cut so as to provide a fairly snug passageway through which the sheet is moved while being cut. Forming of head 12 with opening 33 therethrough provides a surrounding frame area, see FIG. 6, which affords a broad supporting face 44 for the sheet stock being cut in all of the adjusted width dimensions of the sheet entry slot 13, see FIGS. 4–6.

As hereinabove noted, the present device may be designed as an attachment for a standard portable, electric motor-driven saber saw 19 of the type having an electric motor 46, an attached gear box 47, and a handle 48 for manual engagement and positioning of the tool. Gear box 47 is connected to the motor shaft and translates the rotary power derived therefrom into a high-speed oscillation at a saw chuck 49 at the output of the gear box. Normally, a saber saw is attached to chuck 49 and in commonly commercially available tools is driven reciprocally through a distance of approximately ½ to 1 inch. Upper and lower pairs of arms 51 and 52 here project from housing 11 for attachment, as by screws 53, to the housing of the gear box 47. The shape and form of attachment arms 51–52 will vary for, and be custom designed to fit, various common makes of power-driven saber saws of the type here disclosed.

The unit of the present invention is provided with an input drive piece 56 which is formed of conventional shape for demountably securing in chuck 49 and is attached to a reciprocating drive member 57, here carried for reciprocation between guides 58 and 59, mounted within housing 11. Cutting tool 14 is here mounted between a pair of crank arms 61 and 62 and is formed with an elongated opening 63 for receiving an eccentric shaft 66 connecting cranks 61 and 62. As will be best seen from FIGS. 3 and 4, opening 63 is provided in an enlarged portion 67 of tool 14; and portion 67 is mounted for reciprocation between middle guide 59 and a top guide 68 for co-planer reciprocation with drive member 57. Preferably guide member 68 projects upwardly, as seen in FIGS. 1, 4 and 6, for assisting the user in guiding the tool along the line of the cut. Cranks 61 and 62 are here mounted for oscillation on shaves 71 and 72, which project outwardly from cranks 61 and 62 and are journalled in side plates 73 and 74. Cranks 61 and 62 are additionally provided with a connecting eccentric shaft 76, which is engaged in an elongated drive slot 77, formed in drive member 57. Accordingly, motion of drive member 57 is transmitted to cranks 61 and 62 via shaft 76, and such motion is, in turn, transmitted to tool 14 by shaft 66. As a feature of the present construction, the foregoing arrangement provides mechanical advantage in the translation of motion from member 57 to tool 14 and a force multiplication drive for the latter. Preferably, the ½ to 1 inch drive of member 57 is reduced to afford an overall stroke of tool 14 of about 3/16 inch. With such an arrangement, sheet material having a thickness of up to about 3/32 inch can be readily accommodated and cut. With the force multiplication provided, the device will move easily through cold rolled steel sheet up to about 3/32 inch and, of course, will cut softer materials with equal facility. Preferably, to obtain cutting proficiency and durability, the cutting surface and, if desired, the entire blade is made of carbide steel.

Other plates and fasteners making up the assembly of the present unit are illustrated in FIG. 3 and other views of the drawings.

What is claimed is:

1. A portable hand-held power-operated sheet-cutting device comprising:

a support;

a head and mounting means therefor positioning said head in spaced relation to said support and defining therewith a slot providing an entryway for a sheet to be cut; and a tool mounted for reciprocation across said slot substantially perpendicular to said support and being formed with a shoulder offset in the direction of said entryway and providing a cutting edge confronting and being beveled in the direction of said support for impacting a sheet against said support and shearing a chip of material therefrom, said tool having a tapered cross section with its widest dimension at its leading side and a reduced width at its opposite trailing side to provide clearance in the cutaway part of said sheet to permit relative rotational displacement of said tool and sheet for cutting curved configurations;

said mounting means securing said head to said support adjacent the side of said tool opposite said shoulder and having a dimension perpendicular to said slot less than the width of said cutting edge so as to pass by said mounting means the cutaway portion of said sheet and providing a pivotal support for said head for rotational displacement of said head in a plane substantially perpendicular to the axis of reciprocation of said tool thereby enabling said head to follow cutting of said sheet in a curved configuration; and spring means biasing the rotational position of said head for straight-line cutting of said sheet.

2. A device as defined in claim 1, said support comprising a housing formed with opposing side walls forming a guideway supporting said tool for reciprocation, said side walls being formed with transversely aligned chip-ejection openings on opposite sides of said tool; and said tool having a stroke moving said cutting edge across said entryway and into juxtaposition to said openings for discharge of chips therethrough.

3. A device as defined in claim 2, and a guide member mounted medially of said side walls and extending upwardly therefrom for assisting the user in guiding the device along the line to be cut.

4. A device as defined in claim 1, said head having an opening therethrough passing said tool and providing work-supporting surfaces on opposite sides of said tool confronting said support and defining said entryway; and said mounting means being formed to provide adjustable positioning of said head for adjusting the space between said work-supporting surfaces and said support to provide various widths of said entryway.

5. A portable hand-held power-operated sheet-cutting device comprising:

a support;

means spaced from said support and defining therewith a slot providing an entryway for a sheet to be cut;

a tool mounted for reciprocation across said slot substantially perpendicular to said support, said tool being formed with a shoulder offset in the direction of said entryway and providing a cutting edge confronting said support for impacting a sheet against said support and shearing a section of material therefrom;

means adapted for mounting said support on a saber saw having a reciprocating saw chuck; and means connecting said tool to said chuck.

6. A device as defined in claim 5, said last-named means embodying mechanical advantage providing a force multiplication drive for said tool.

* * * * *